US009286624B2

(12) United States Patent
Chau

(10) Patent No.: US 9,286,624 B2
(45) Date of Patent: Mar. 15, 2016

(54) SYSTEM AND METHOD OF DISPLAYING ANNOTATIONS ON GEOGRAPHIC OBJECT SURFACES

(75) Inventor: Stephen Chau, Stanford, CA (US)

(73) Assignee: Google Inc., Mountain View, CA (US)

( * ) Notice: Subject to any disclaimer, the term of this patent is extended or adjusted under 35 U.S.C. 154(b) by 1032 days.

(21) Appl. No.: 12/556,994

(22) Filed: Sep. 10, 2009

(65) Prior Publication Data

US 2015/0262391 A1 Sep. 17, 2015

(51) Int. Cl.
| | | |
|---|---|---|
| *G06Q 30/00* | (2012.01) | |
| *G06Q 30/02* | (2012.01) | |
| *G06K 9/00* | (2006.01) | |
| *G06T 11/00* | (2006.01) | |

(52) U.S. Cl.
CPC ........ *G06Q 30/0259* (2013.01); *G06K 9/00476* (2013.01); *G06Q 30/0261* (2013.01); *G06T 11/00* (2013.01)

(58) Field of Classification Search
CPC .......................... G06Q 30/0259; G06Q 30/026
USPC ............. 705/14.49, 14.5, 14.57, 14.72, 14.58
See application file for complete search history.

(56) References Cited

U.S. PATENT DOCUMENTS

| 5,581,638 | A | 12/1996 | Givens et al. | |
|---|---|---|---|---|
| 5,903,317 | A * | 5/1999 | Sharir et al. | 348/589 |
| 6,285,317 | B1 | 9/2001 | Ong | |
| 6,556,917 | B1 | 4/2003 | Wawra et al. | |
| 6,621,423 | B1 | 9/2003 | Cooper et al. | |
| 6,785,421 | B1 | 8/2004 | Gindele et al. | |
| 7,451,041 | B2 | 11/2008 | Laumeyer et al. | |
| 7,716,161 | B2 | 5/2010 | Dean et al. | |
| 7,792,883 | B2 | 9/2010 | Buron et al. | |
| 7,983,949 | B1 | 7/2011 | Joseph et al. | |
| 8,099,109 | B2 * | 1/2012 | Altman et al. | 455/456.3 |
| 8,558,848 | B2 * | 10/2013 | Meadow et al. | 345/632 |
| 2005/0027705 | A1 | 2/2005 | Sadri et al. | |
| 2007/0244751 | A1 * | 10/2007 | Zalewski et al. | 705/14 |
| 2008/0086356 | A1 | 4/2008 | Glassman et al. | |
| 2008/0154888 | A1 | 6/2008 | Buron et al. | |
| 2009/0192874 | A1 * | 7/2009 | Powles et al. | 705/10 |
| 2009/0198607 | A1 | 8/2009 | Badger et al. | |
| 2009/0263026 | A1 | 10/2009 | Verne et al. | |
| 2009/0319348 | A1 * | 12/2009 | Khosravy et al. | 705/14.1 |
| 2009/0327078 | A1 | 12/2009 | Ohazama et al. | |
| 2010/0010958 | A1 | 1/2010 | Perrow et al. | |
| 2010/0185509 | A1 | 7/2010 | Higgins et al. | |
| 2010/0198814 | A1 | 8/2010 | Petersen et al. | |
| 2010/0250366 | A1 * | 9/2010 | Smith et al. | 705/14.58 |
| 2011/0061003 | A1 | 3/2011 | Miyazawa et al. | |
| 2012/0150627 | A1 | 6/2012 | Hicken et al. | |
| 2012/0278171 | A1 * | 11/2012 | Tang | G06Q 30/02 705/14.57 |

* cited by examiner

*Primary Examiner* — James W Myhre

(74) *Attorney, Agent, or Firm* — Dority & Manning, P.A.

(57) ABSTRACT

A system and method of displaying information on images representing geographic objects captured by a camera is provided. In one aspect, the information is an advertisement and the advertisement is displayed such that its shape is based on the surface angle of the geographic object relative to the perspective from which the object is being viewed.

25 Claims, 20 Drawing Sheets

Object Position Data
Camera = (Lat$_1$°, Lon$_1$°, Alt$_1$ meters)
Surface 1
• Vertex 1 = (Lat$_2$°, Lon$_2$°, Alt$_2$ meters)
• Vertex 2 = (Lat$_3$°, Lon$_3$°, Alt$_3$ meters)
• Vertex 3 = (Lat$_4$°, Lon$_4$°, Alt$_4$ meters)
• Vertex 4 = (Lat$_5$°, Lon$_5$°, Alt$_5$ meters)
....
Pixel at $(x_a, y_a)$= Surface 1
Pixel at $(x_b, y_b)$= Surface 2

SYSTEM AND METHOD OF DISPLAYING ANNOTATIONS ON GEOGRAPHIC OBJECT SURFACES

BACKGROUND OF THE INVENTION

Services such as Google Maps provide users with the ability to view maps. They also provide businesses and other users with the ability to upload information that may be used to annotate the map. For example, when users search maps for local information, they may see information about businesses located in the area, such as the business' address, hours of operation, photos or products. This information may be shown as a pop-up window that appears on the map when an icon associated with business is clicked.

Google Maps is also capable of displaying street level images of geographic locations. These images, identified in Google Maps as "Street Views", typically comprise photographs of buildings and other features and allow a user to view a geographic location from a person's perspective as compared to a top-down map perspective. The street level images tend to be taken at discrete locations.

The Google Maps service provides a variety of mechanisms that allow a user to change the perspective (such as location and angle) used to view the images. For example, the service overlays at least some images with a yellow line that indicates the orientation of the street relative to the perspective and provides a names of the street. When the user clicks on an arrow on the yellow line, a street level image at a different location is typically loaded.

BRIEF SUMMARY OF THE INVENTION

In one aspect, a method of displaying an image is provided. The method includes receiving a request for an image at a geographic location, the request being associated with a location and identifying, with a processor, a captured image in response to the request. The captured image represents a geographic object captured by a camera, and is identified based on the proximity of the camera's geographic position relative to the requested location. The method also includes identifying, with a processor, object position data associated with the geographic location of a surface of the geographic object as well as annotation information, wherein the annotation information comprises information to be displayed with the captured image. A second image is generated, with a processor, based on the captured image and the annotation information such that a portion of the captured image is replaced with a representation of the annotation information, and the annotation information is displayed so as to conform with the geographic location of the surface based on the perspective from which the surface is being viewed. The second image is provided to an electronic display.

In another aspect, a method of displaying a geographic object is provided that includes transmitting, over a network, data identifying a location and receiving, from the network, data representing an image, and displaying the image on an electronic display. A portion of the image comprises an image of a geographic object that was taken proximate to the location at a camera position, whereby the geographic object has a surface. A portion of the image comprises an advertisement, where the portion was determined by a processor such that the advertisement is displayed on the surface of the geographic object such that the portions of the advertisement that correspond with the surfaces closer to the camera position are displayed larger than the portions of the advertisement that correspond with the surfaces that are farther from the camera position.

In still another aspect, a system includes a user input device, a memory storing instructions, a first processor in communication with the user input device so as to process information received from the user input device in accordance with the instructions, and a display in communication with, and displaying data received from, the processor. The instructions include: providing data identifying a location; receiving and displaying image data representing a geographic object and additional information that was not visible on the geographic object when the image data was captured, the additional information being displayed such that additional information appears to lie on a surface of the geographic object and the shape of the geographic object changes when the angle from which the geographic object is viewed changes; and displaying the image on an electronic display.

A further aspect relates to a system of displaying images. The system includes a first device at a first node of a network, the first device comprising a first memory storing a first set of instructions, a first processor that processes data in accordance with the first set of instructions, and an electronic display. It also includes a second device at a second node of a network, the second device comprising a second memory storing a second set of instructions and a second processor that processes data in accordance with the second set of instructions. The first set of instructions include receiving a location identified by a user, transmitting the location to the second device over the network, receiving a street level image from the second device, and displaying the image. The second set of instructions include receiving the location from the first device, selecting a street level image from a database based on the location, selecting information to be displayed based on the location, processing the street level image and the information to create an image containing both the street level image and the information such that the shape of the information on the image is based on the angle between a surface of the building and the direction of the camera when the image was captured, and transmitting the created image to the first device for display on the electronic display.

DETAILED DESCRIPTION

In one aspect, a system and method is provided whereby customers may associate advertisements with geographic objects captured in street level images. When the advertisement is displayed, it is shaped to convey the appearance of the advertisement lying on the surface of the geographic object, such as billboard painted on the surface. This appearance may be maintained even when the location and position used to view the geographic object changes.

Figure 1:
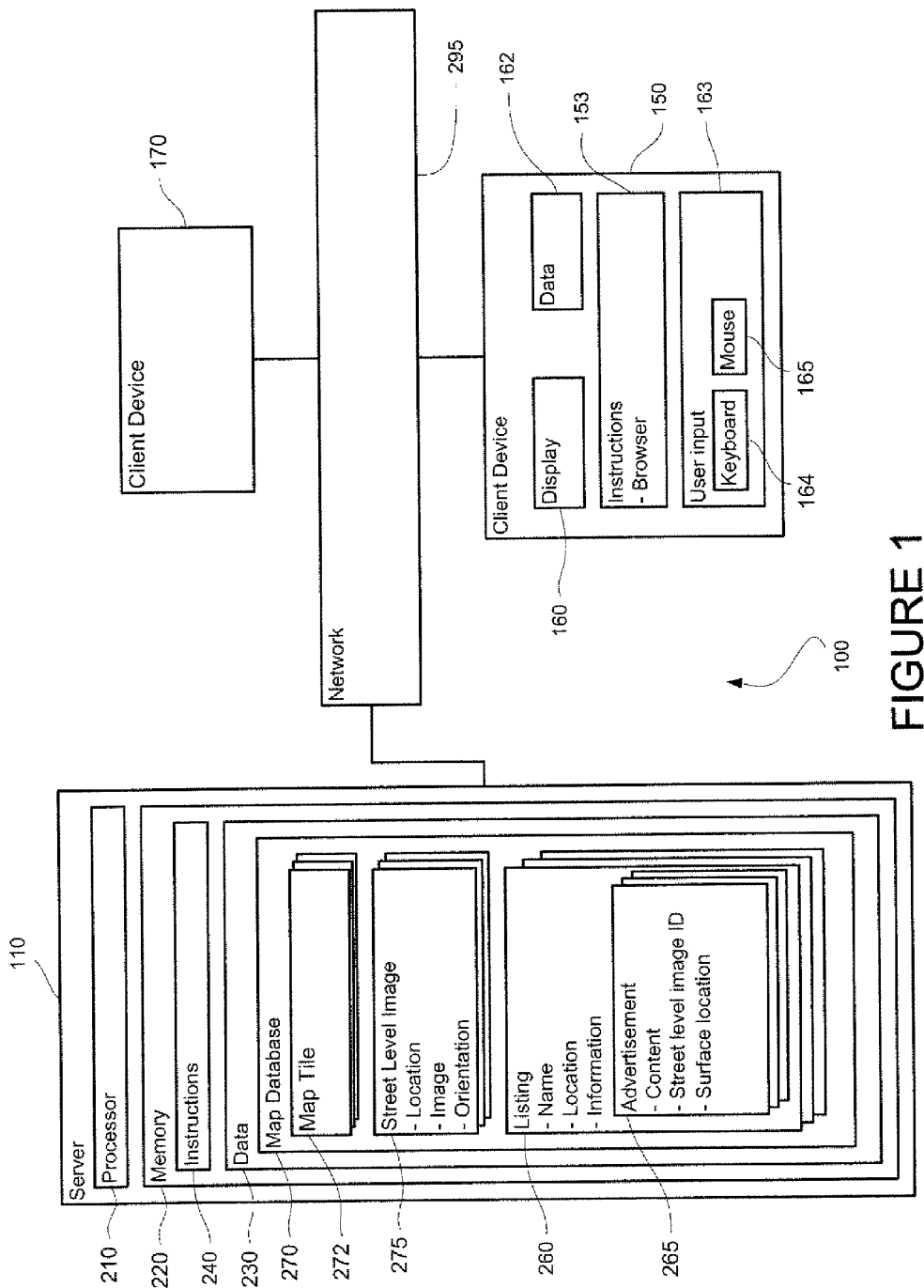
FIG. 1 is a functional diagram of a system in accordance with an aspect of the invention.
Figure 2:
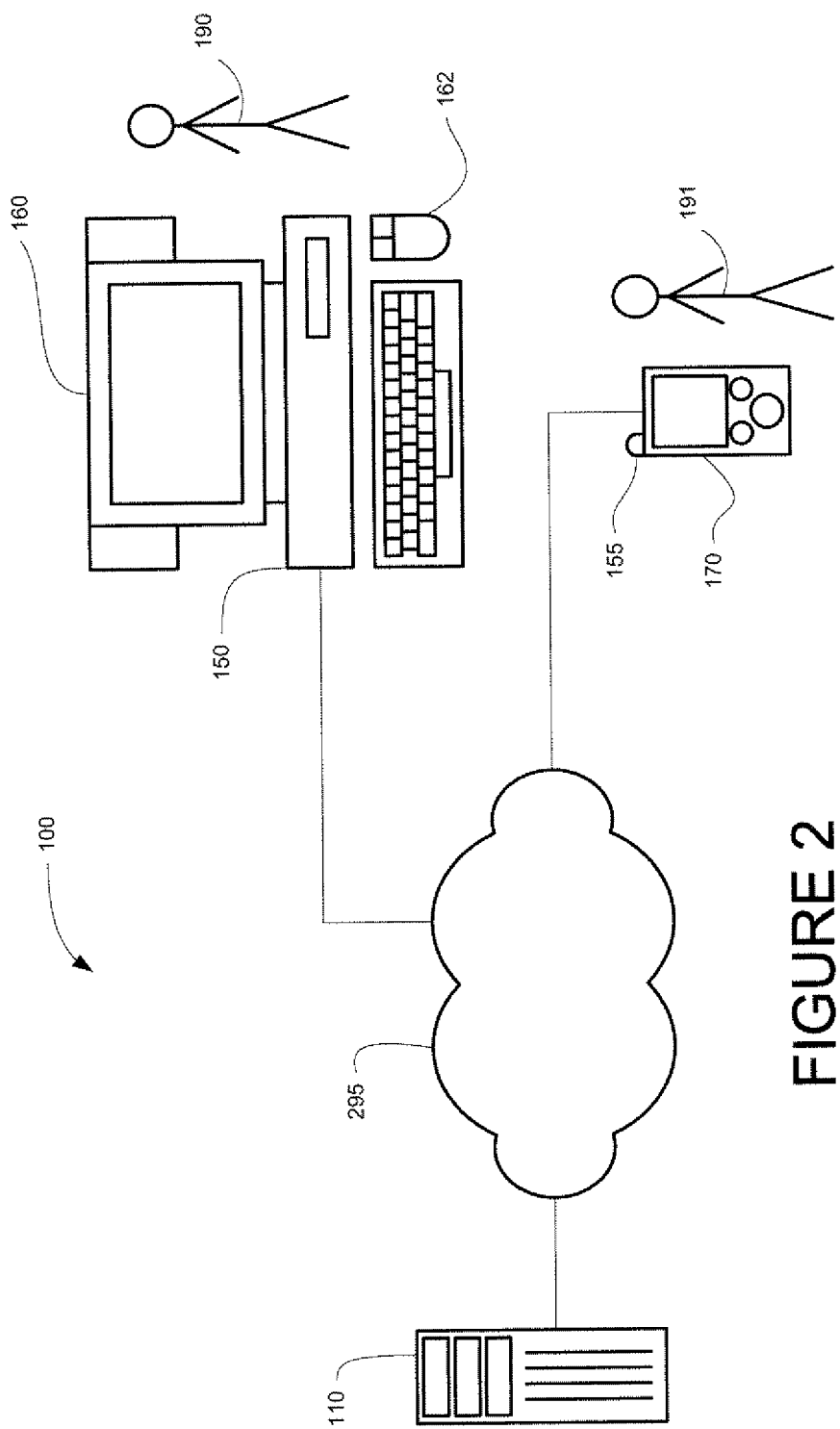
FIG. 2 is a pictorial diagram of a system in accordance with an aspect of the invention.

As shown in FIGS. 1-2, a system 100 in accordance with one aspect of the invention includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 210 may be any well-known processor, such as processors from Intel Corporation or AMD. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client devices 150, 170. For example, computer 110 may be a web server. Each client device may be configured similarly to the server 110, with a processor, memory and instructions. Each client device 150, 170 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input (for example, a mouse 163, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client devices 150 and 170 may comprise a full-sized personal computer, the system and method may also be used in connection with mobile devices capable of wirelessly exchanging data with a server over a network such as the Internet. For example, client device 170 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA) or any other means of user input.

The server 110 and client devices 150 and 170 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Map database 270 of server 110 stores map-related information, at least a portion of which may be transmitted to a client device. For example, map database 270 may store map tiles 272, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receipt of a geographical location.

As further described below, locations may be expressed and requested in various ways including but not limited to latitude/longitude positions, street addresses, points on a map (such as when a user clicks on a map), building names, other data capable of identifying one or more geographic locations, and ranges of the foregoing.

Figure 3:
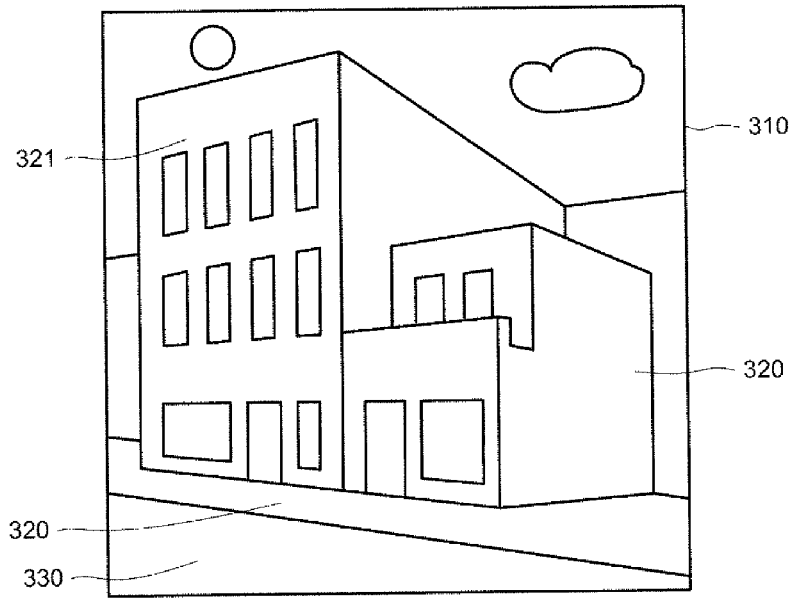
FIG. 3 is a street level image, captured by a camera, in accordance with an aspect of the invention.
Figure 4:
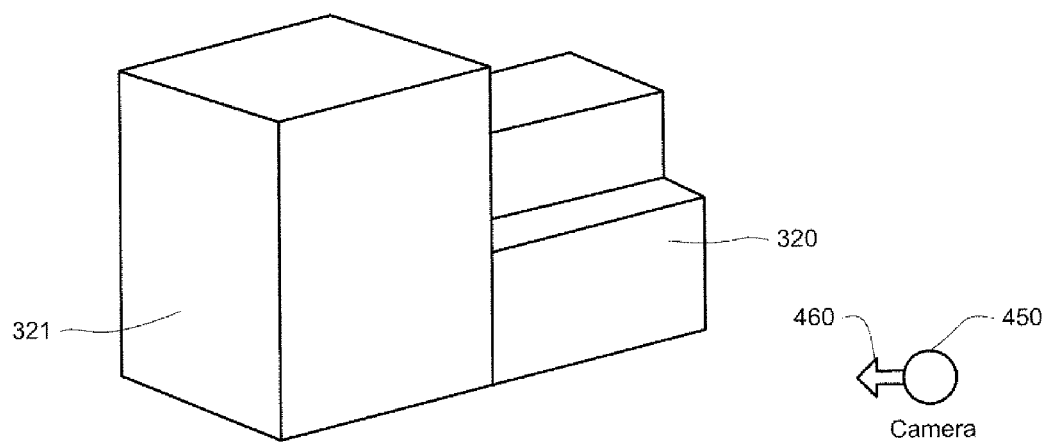
FIG. 4 is a diagram functionally illustrating, in accordance with an aspect of the invention, the relative geographic positions of objects within a street level image and the position and angle of a camera used to capture the street level image.

The map database may also store street level images 275. A street level image is an image of geographic objects that was captured by a camera at an angle generally parallel to the ground. Both the geographic objects in the image and the camera have a geographic location relative to one another. Thus, as shown in FIG. 3, street level image data may represent various geographic objects such as buildings 320-321, sidewalks 320 and street 330. It will be understood that while street level image 310 only shows a few objects for ease of explanation, a typical street level image will contain as many objects associated with geographic locations (street lights, mountains, trees, bodies of water, vehicles, people, etc.) in as much detail as the camera was able to capture. FIG. 4 pictorially illustrates the geographic locations of the buildings 320-21 relative to the geographic position 450 and angle 450 of the camera when the image was captured.

The objects in the street level images may be captured in a variety of different ways. For example, the street level image may be captured by a camera mounted on top of a vehicle, from a camera angle pointing roughly parallel to the ground and from a camera position at or below the legal limit for vehicle heights (e.g., 7-14 feet). (Street level images are not limited to any particular height above the ground; a street level image may be taken from the top of building.) Panoramic street-level images may be created by stitching together a plurality of photographs taken from different camera angles. The camera may be any device capable of capturing optical images of objects including film cameras, digital still cameras, analog video cameras and image sensors (by way of example, CCD, CMOS or other).

Each street level image may be stored as a set of pixels associated with color and brightness values. For example, if the images are stored in JPEG format, the image will be displayed as a set of pixels in rows and columns, with each pixel being associated with a value that defines the color and brightness of the image at the pixel's location.

In addition to being associated with geographic locations, street level images 275 are typically associated with information indicating the orientation of the image. For example, if the street level image comprises a typical photograph, the orientation may simply be the camera angle such as an angle that is 30° east of true north and rises 2° from ground level. If the street level images are panoramic images, such as 360° panoramas centered at the geographic location associated with the image, the orientation may indicate the portion of the image that corresponds with looking due north from the camera position at an angle directly parallel to the ground.

Street level images may also be stored in the form of videos, such as by displaying MPEG videos captured by an analog video camera or displaying, in succession, time-sequenced photographs that were captured by a digital still camera.

Memory 220 also stores object position data representing the geographic position of the geographic objects in the street level images. The object position data may be stored in any number of formats and the terms "location" and "position" are used interchangeably herein.

Figure 5:
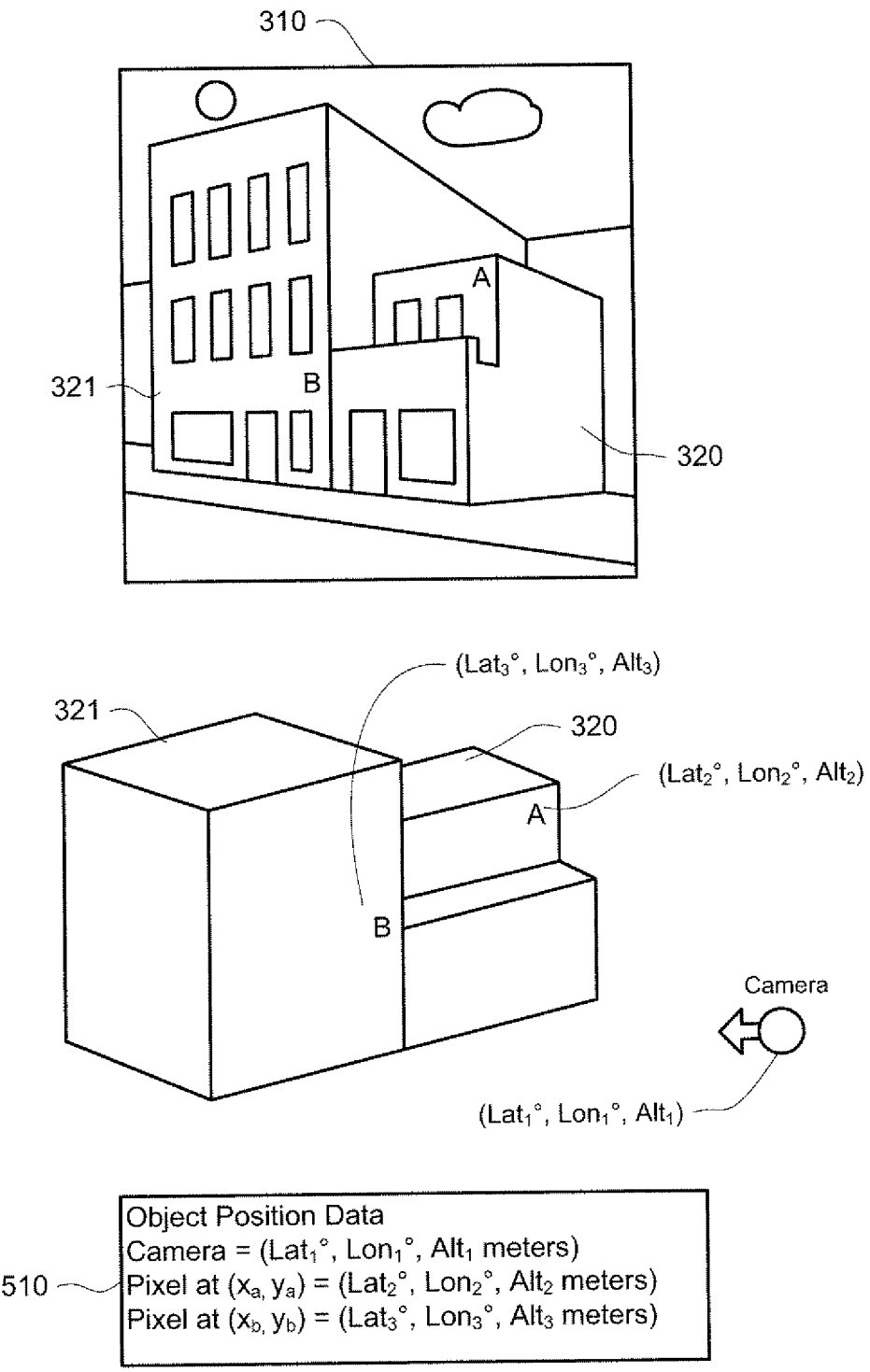
FIG. 5 is a street level image, a functional diagram of the geographic positions of objects within the street level image relative to a camera position, and object position data in accordance with an aspect of the invention.

In one aspect, the object position data stores values representing the geographic locations of the surfaces facing the camera. In that regard, a separate value may be stored for each pixel of the street level image where the value represents the geographic position of the surface that is illustrated at that pixel. Thus, as shown in FIG. 5, the pixel at row $y_a$ and column $x_a$ (hereafter, "($x_a$, $y_a$)") of the street level image 310 represents a portion of the surface of building 320 at point "A". One of the values associated with the pixel may be the color and brightness of that portion of the surface as captured by the camera.

The other value associated with the pixel may be the geographic position of that portion of the surface. For example, the value may reflect the portion's latitude/longitude and altitude position and be expressed as a coordinate of the form ($Lat_2°$, $Lon_2°$, $Alt_2$ meters). The geographic location of the portion of building 321 shown at the pixel at position "B" may be similarly represented as ($Lat_3$, $Lon_3$, $Alt_3$). The object position data 510 may also store the geographic location of the camera position as ($Lat_1$, $Lon_1$, $Alt_1$). Pixels that are not associated with a surface may be associated with a null or default surface value.

Figure 6:
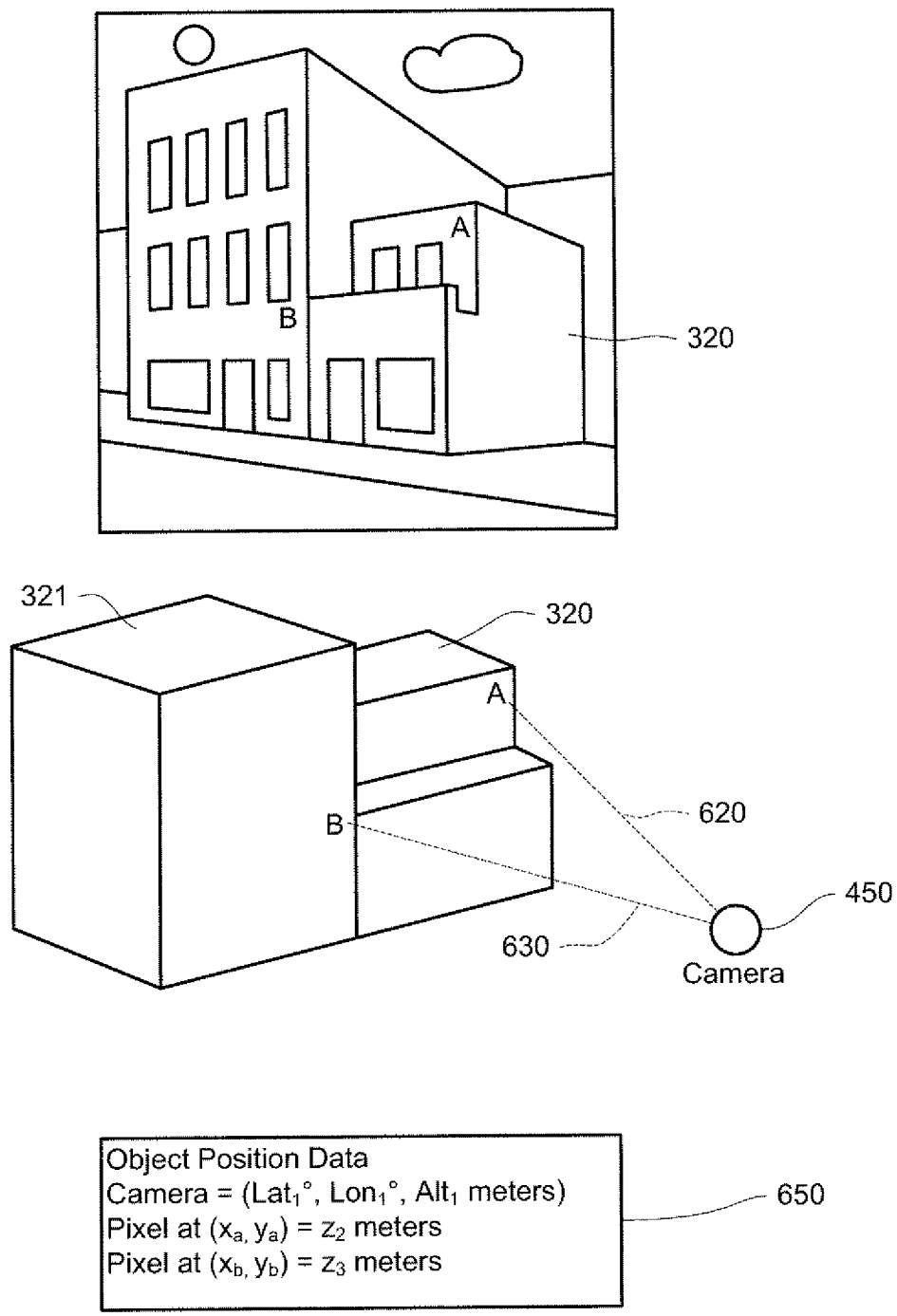
FIG. 6 is a street level image, a functional diagram of the geographic positions of objects within the street level image relative to a camera position, and object position data in accordance with an aspect of the invention.

In still another aspect, the object position data may store the distances from the objects to the camera at each pixel of the image. Thus, as shown in FIG. 6, the object position data 650 may define the distance 620 from the camera position 450 to the surface of building 320 at pixel "A". Similarly, the object position data may define the distance 630 from the camera position 450 to the surface of building 321 at pixel "B".

Figure 7:
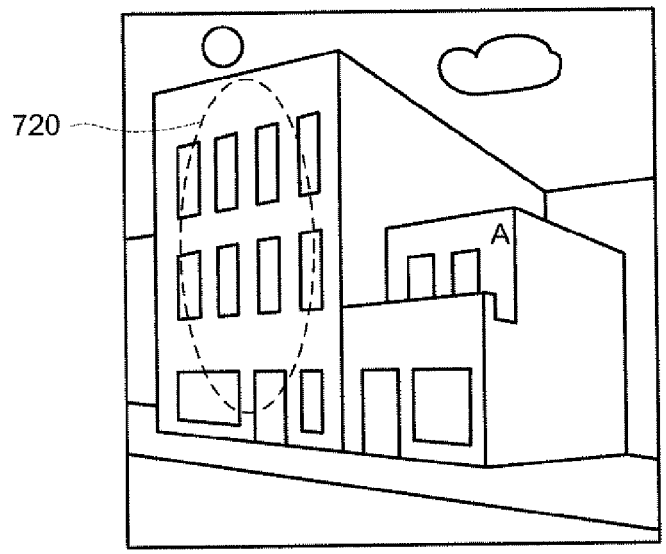
FIG. 7 is a street level image, a functional diagram of the geographic positions of objects within the street level image relative to a camera position, and object position data in accordance with an aspect of the invention.
Figure 7:
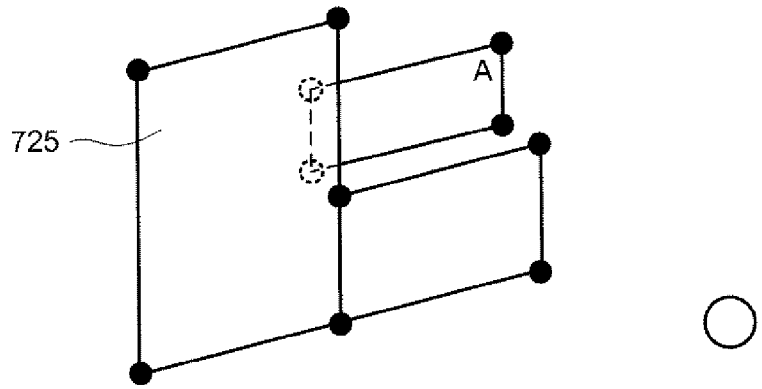

In another aspect, the geographic locations of the surfaces facing the camera are stored as polygons. Thus, as shown in FIG. 7, the surface 720 of building 320 that faces the camera may be defined as a polygon 725 having four vertices, each vertex being associated with a different geographic location. For example, the surface may be referenced in object position data 750 as a set of vertices at positions $(Lat_2, Lon_2, Alt_2)$, $(Lat_3, Lon_3, Alt_3)$, $(Lat_4, Lon_4, Alt_4)$ and $(Lat_5, Lon_5, Alt_5)$. The surfaces of the other objects may be similarly stored along the location of the camera. The object position data may further define, for each pixel in the image, the surface that corresponds with the pixel. For example, the object position data for the pixel at position "B" may reference polygon 725.

Other formats for storing the object position data may also be used. For example, rather than being associated with absolute values such as latitude/longitude, the values may be relative and in any scale. In various aspects of the system and method, when a first type of information is used to store the object position data (such as storing the latitude, longitude and altitude of the camera and surface), information of another type may be generated from it (such as calculating the distance between the camera and a surface).

Certain formats permit the surface information to be stored independently of the street level images taken by the camera. For example, object position data stored as described in FIG. 7 may be stored without reference to the street level image or camera position. If the object position data for a street level image is required, such object position data may be retrieved by searching for those surfaces that are proximate to the street level image's camera position and in front of other surfaces.

A variety of systems and methods may be used to collect the surface information. By way of example only, a laser range finder may be used. In addition, stereoscopic systems employing two cameras, spaced slightly apart yet looking at the same scene, may be used as well; by analyzing the slight differences between the images seen by each camera, it is possible to estimate the distance at each point in the images. In yet another aspect, the information may be compiled by using a single video camera, travelling at a particular velocity, to capture the street level imagery as the scenery passes by. The video may not only be used as the street level image, but subsequent frames may be compared to extract the different distances between the objects and the camera (e.g., mountains in the distance will stay in the frame much longer than a fire hydrant passing by along the street).

Map database 270 may also store listing information 260 identifying local businesses or other objects or features associated with particular geographic locations. For example, each listing 274 may be associated with a name, a category (such as "pizza", "Italian restaurant" or "ballpark"), other information and a location. The database may be compiled by automatically gathering business information (such as from websites or telephone directories), or users may enter or edit the listing information themselves via web pages served by the server 110.

As explained in more detail below, listings 274 may further be associated with advertisements 265. Each advertisement, in turn, may be associated with data identifying content, the identity of a street level image and a location on a surface of an object represented in the street level image.

In many cases, there will be a single listing 274 in the map database 270 for each different business. However, it will be understood that the same business may be associated with many different listings, and that a single listing may be associated with many different businesses.

Listings may include other geographically-located objects in addition to or instead of businesses. For example, they may also identify homes, landmarks, roads, bodies of land, the current position of a car, items located in a store, etc. Therefore, references to business listings will be understood as examples only, and not a limitation on the type of listings, or advertisements associated therewith, that may be the subject of the system and method.

Figure 19:
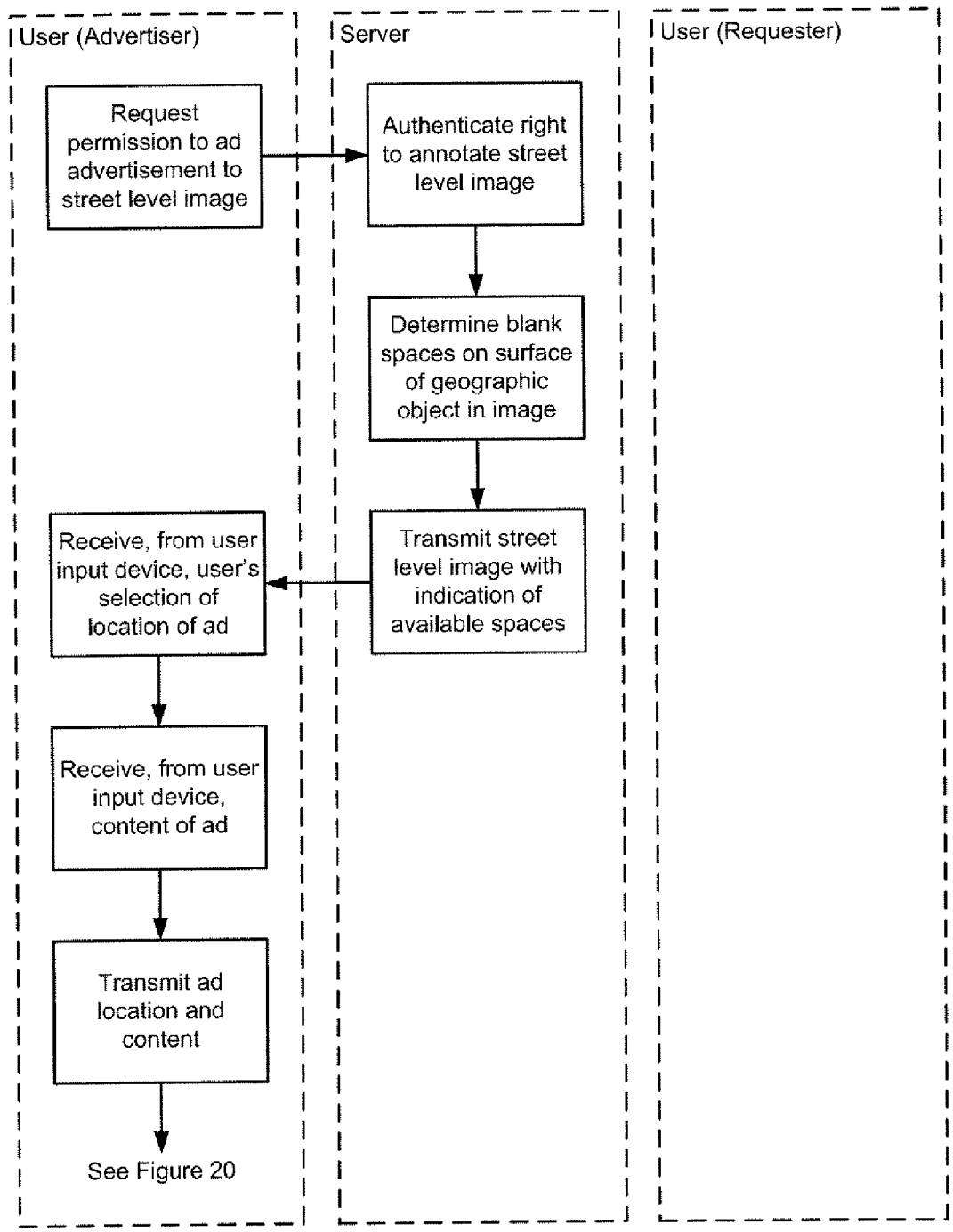
FIG. 19 is a flowchart in accordance with an aspect of the invention.
Figure 20:
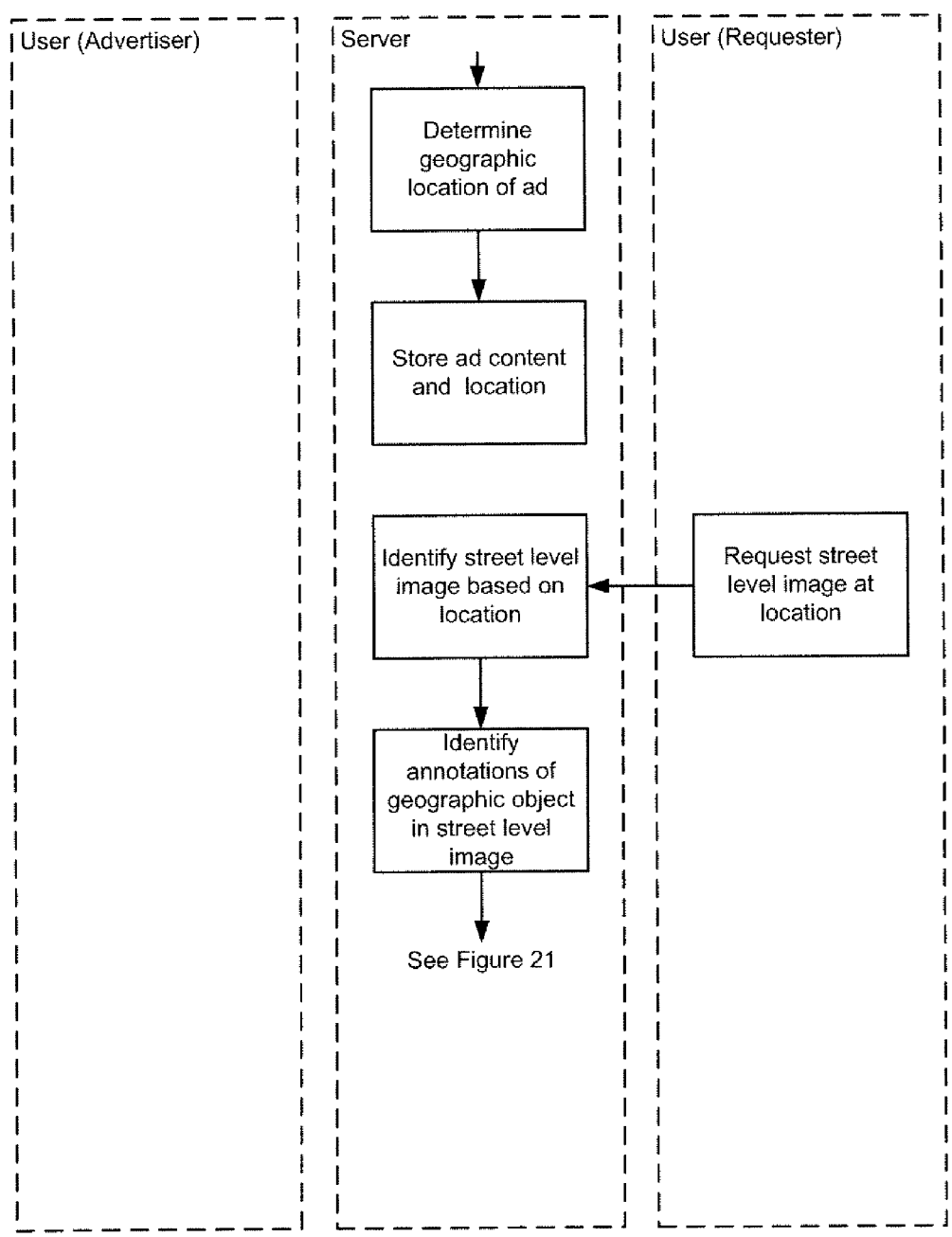
FIG. 20 is a flowchart in accordance with an aspect of the invention.
Figure 21:
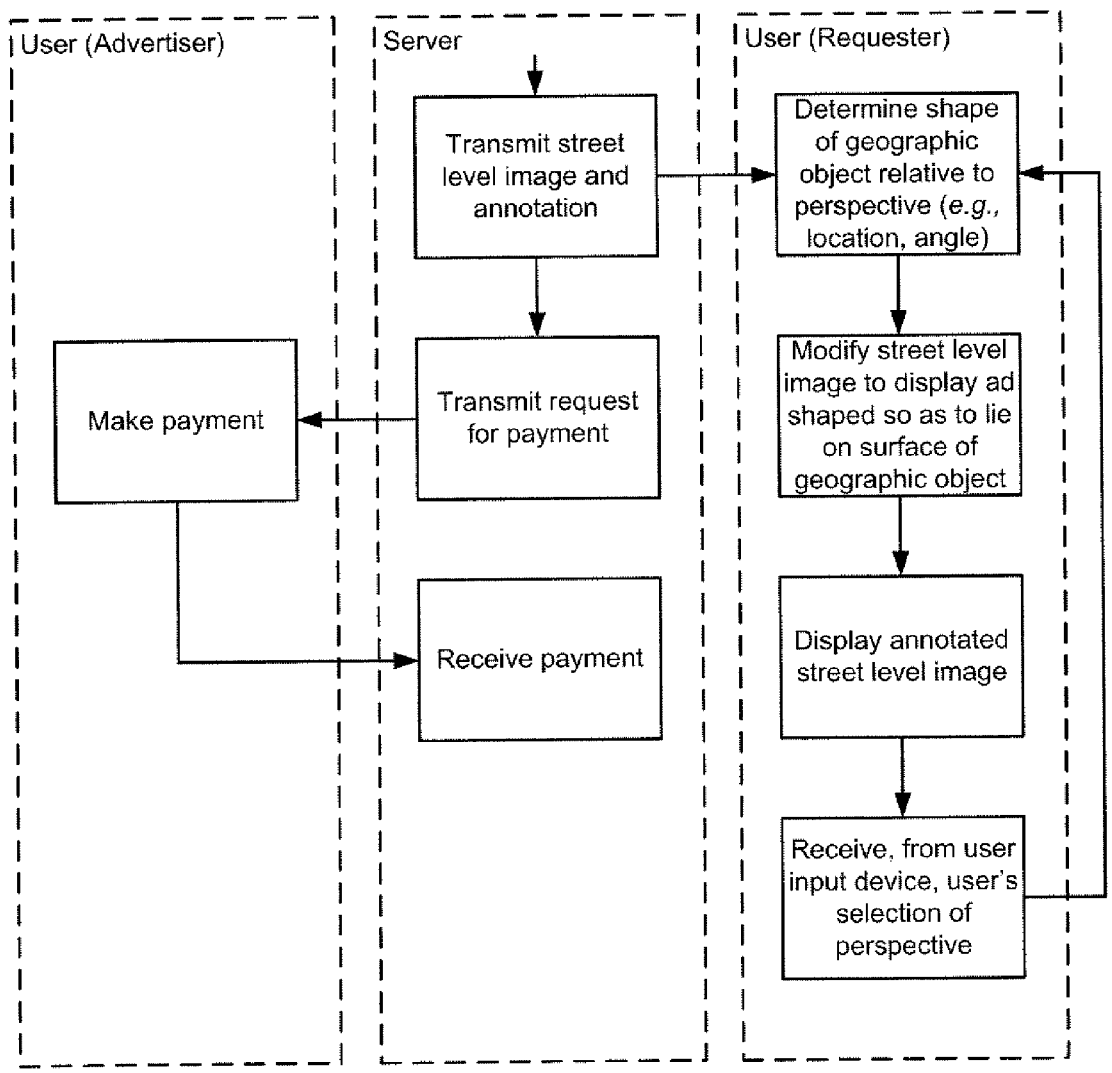
FIG. 21 is a flowchart in accordance with an aspect of the invention.

In addition to the operations illustrated in FIGS. 19-21, various operations in accordance with a variety of aspects of the invention will now be described. It should be understood that the following operations do not have to be performed in the precise order described below. Rather, various steps can be handled in reverse order or simultaneously.

Figure 8:
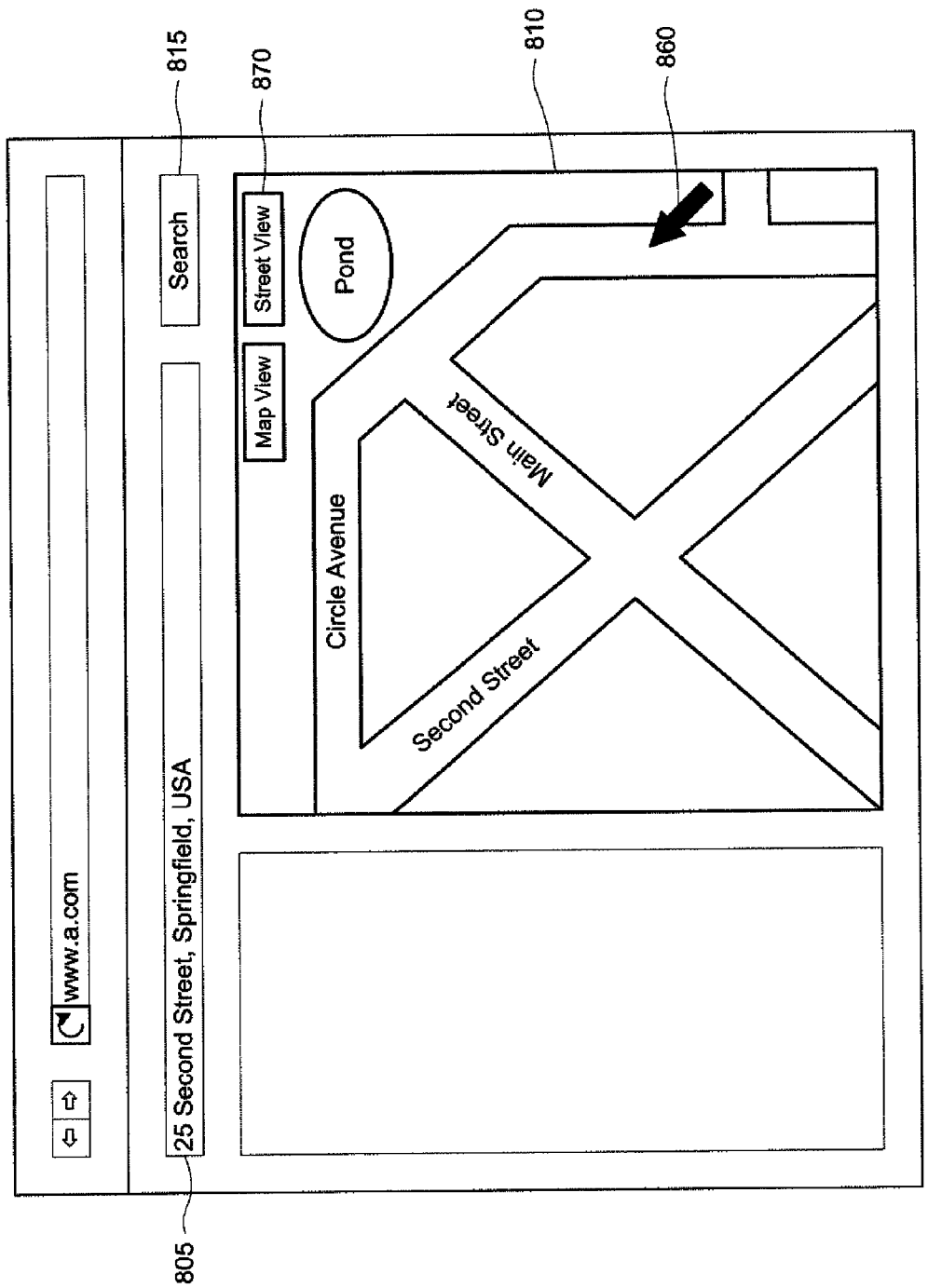
FIG. 8 is a screen shot in accordance with an aspect of the invention.

FIG. 8 illustrates a screen shot that may be displayed by the display associated with a client device such as client device 150. For example, the system and method may be implemented in connection with an Internet browser such as Google Chrome displaying a web page showing a map 810 and other information. The program may provide the user with a great deal of flexibility when it comes to requesting a location to be shown in a street level view. For example, the user may enter text identifying a location in textbox 805 such as an address, the name of a building, or a latitude and longitude. The user may then transmit the location to the server by selecting search button 815. The user may further use a mouse or keypad to move a mouse cursor 860 to identify a particular geographical location on the map. Yet further, the program may provide a button 870 or some other feature that allows a user to request a street level view at the specified geographical location.

The street level image is retrieved based on the location requested by the user. For example, the user may have used a keyboard to enter a street address into a browser. When the street address is transmitted by the client device 150 to the server 110, the server may use a geocoder to convert the street address into a latitude/longitude. The server then may then select the street level image that is associated with the latitude/longitude value that is closest to the converted latitude/longitude value. Yet further, the user may have clicked a particular location on the map 810 to view from a street level perspective.

Figure 9:
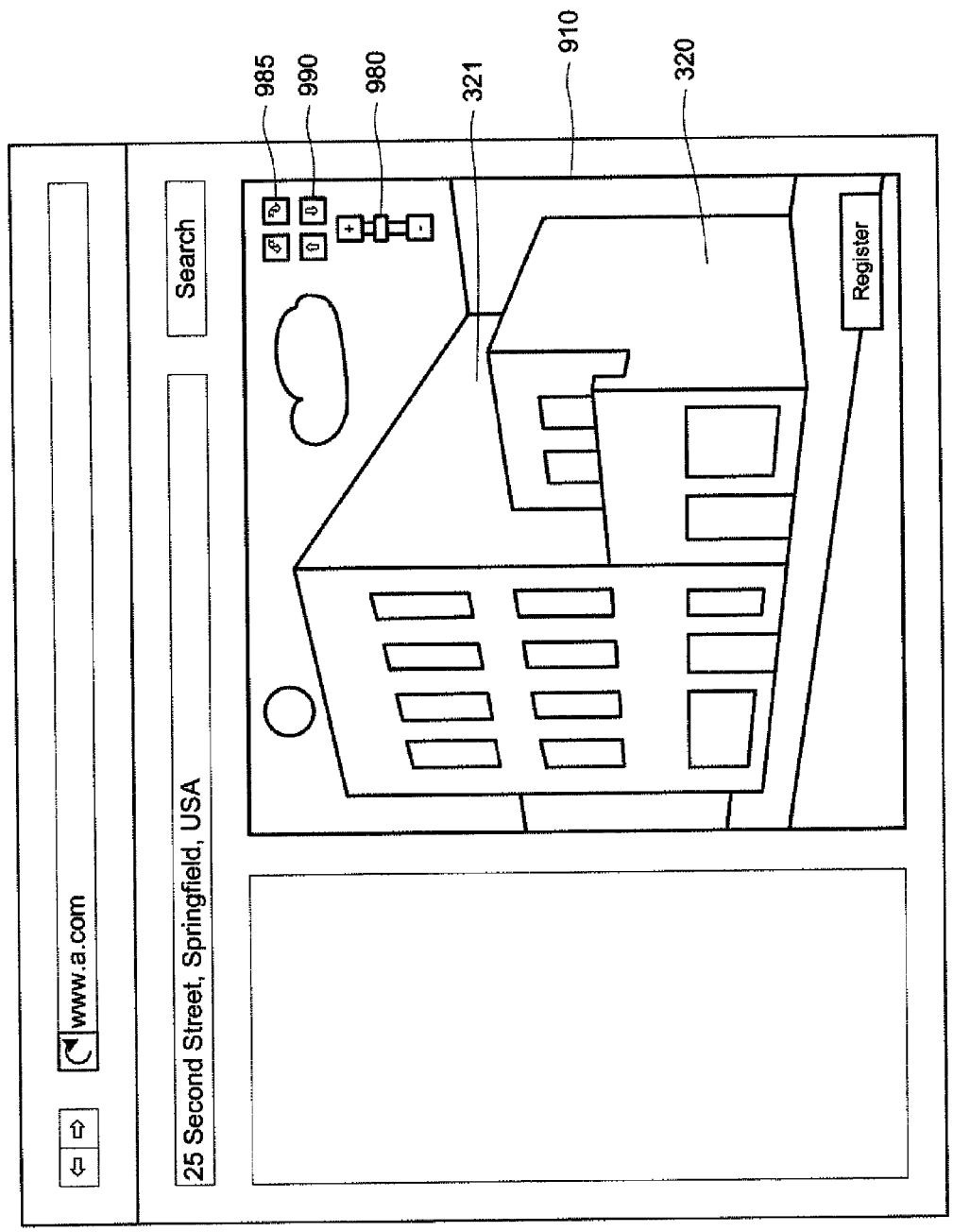
FIG. 9 is a screen shot in accordance with an aspect of the invention.

As shown in FIG. 9, the street level image 910 of geographic objects 320-21 may be shown in the browser along with user-selectable controls for changing the location or orientation of the viewpoint. The controls may include controls 980 for zooming the image in and out, as well as controls 985 to change the orientation of the view, such as changing the direction from looking northeast to looking northwest. If the street level image was downloaded as an entire 360° panorama, changing the direction of the view may necessitate only displaying a different portion of the panorama without retrieving more information from the server.

The user may also change the location of the viewpoint. For example, the user may move the viewpoint forwards or backwards in the currently-viewed direction by selecting controls 990.

Other navigation controls may be included as well, such as controls in the form of arrows disposed along a street that may be selected to move the vantage point up or down the street. A user may also operate the arrow controls of a keyboard to change the zoom, direction or location of the view. A user may further select portions of the image, such as by moving and clicking a computer mouse or tapping a touch-sensitive screen, to select and move closer to the objects displayed in the image. Depending on the street level image data that was downloaded, a change in location may necessitate the client device obtaining more street level image data from the server. Thus, changing locations may cause the client device to retrieve a different street level image.

Figure 10:
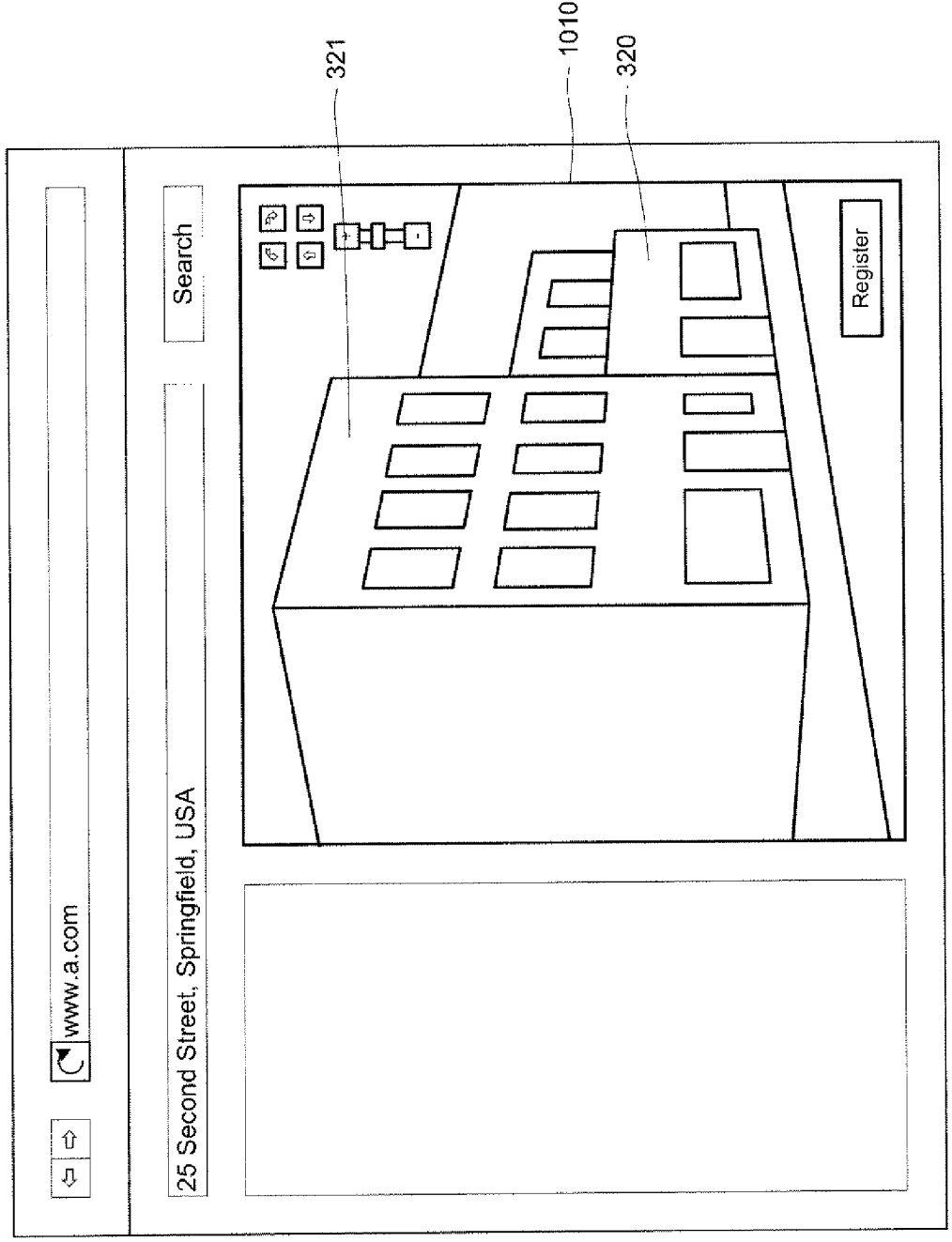
FIG. 10 is a screen shot in accordance with an aspect of the invention.
Figure 11:
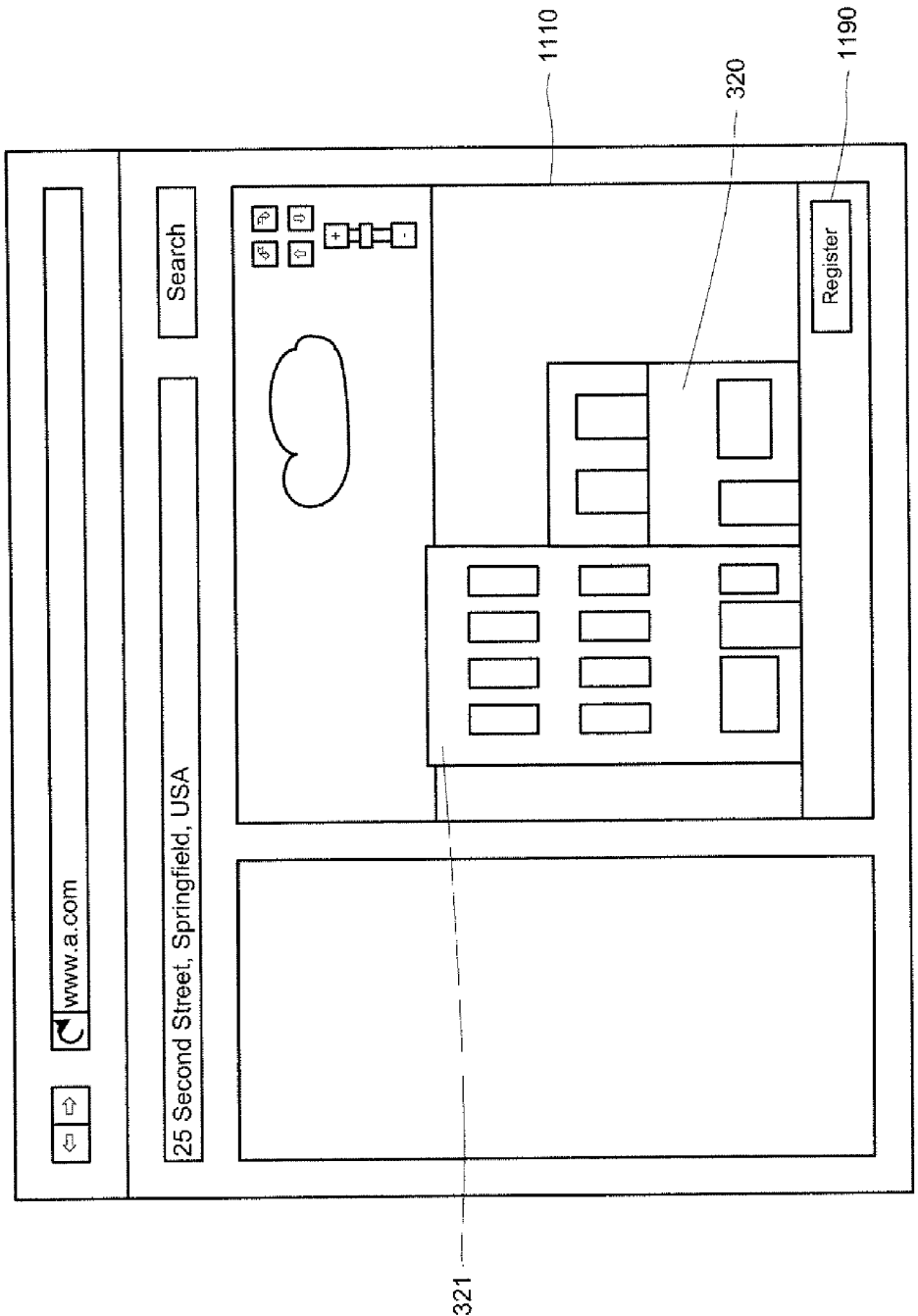
FIG. 11 is a screen shot in accordance with an aspect of the invention.

FIG. 10 illustrates how the geographic objects 320-21 of FIG. 9 may appear when viewed from another location and camera angle. Specifically, street level image 1010 is a different image inasmuch as it was taken at a different camera location and angle. Even so, it captures two of the same buildings as street level image 910 even thought it does so from a different perspective. Similarly, FIG. 11 shows street level image 1110 that captured the same two geographic objects 320-21 from yet another camera position and angle; specifically, directly in front of and facing the two buildings.

A user may indicate that they wish to annotate the surfaces of the geographic objects displayed in the image.

In one aspect, the user must provide some evidence that they are authorized to annotate a particular geographic object such as a building. The system and method may, among other things, only permit a business to annotate a building if the business is located in the business. By way of example, the browser may display a button 1190 that allows the user to register one or more geographic objects in the street level image 1110. The server may determine the street address of the displayed geographic object based on a geocoder and the object's latitude/longitude location, and send a registration form to the building and addressed to the business. When the business returns the form, the business is authenticated and allowed to annotate the server's images of the building. Other authentication methods may be used as well, such as integrating the authentication into account login or management web pages, such as web page that allows a business to create or manage a business listing or create or manage advertisements.

Figure 12:
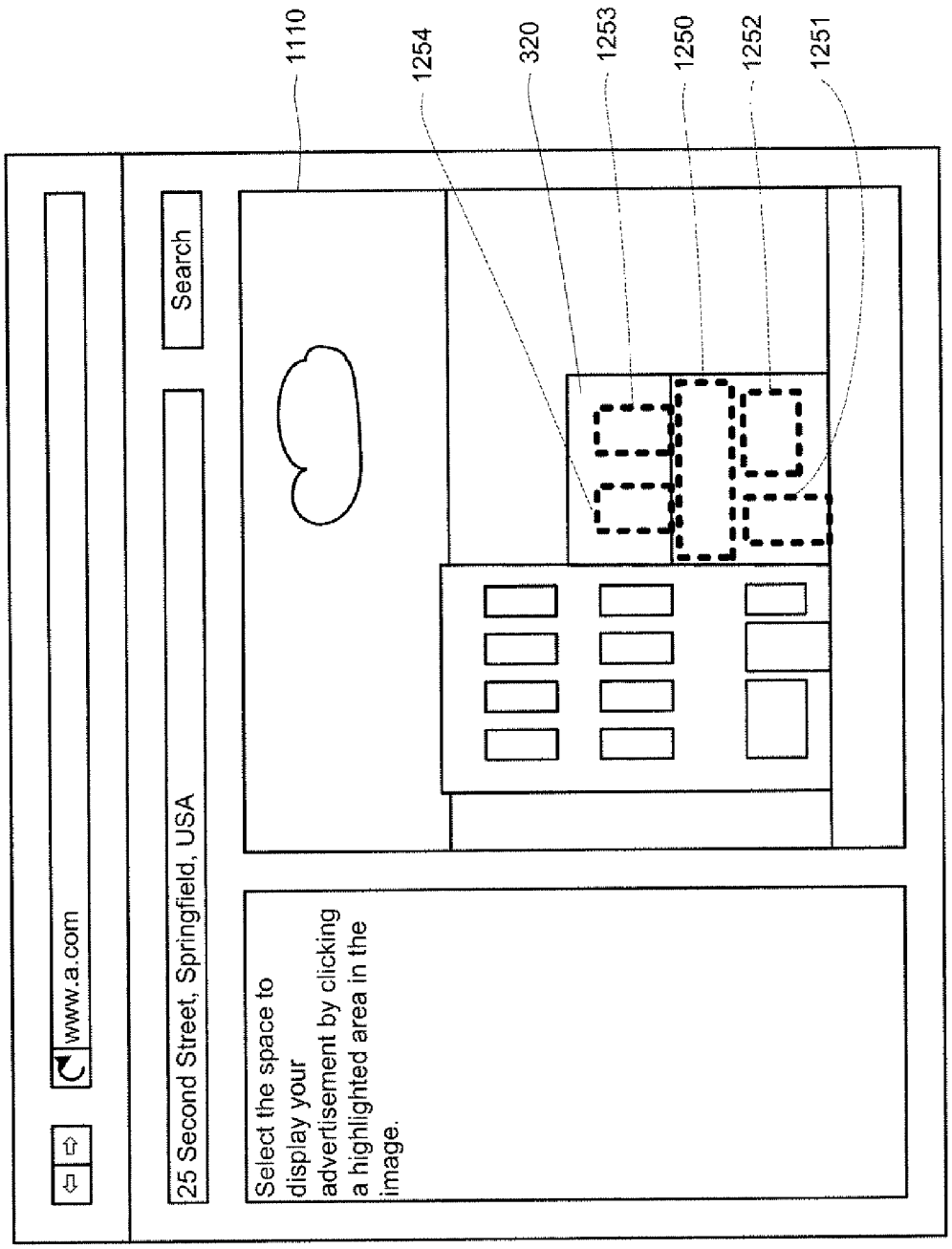
FIG. 12 is a screen shot in accordance with an aspect of the invention.

The user may be presented with a variety of options for placing advertising or other annotations on the user's registered objects. As shown in FIG. 12, if the user registered building 320, the server may highlight different areas of blank space on the picture of the user's business and allow the user to select the space to display the advertisement. By way of example, the door 1251, windows 1252-54 or the space 1250 above the doors and windows may be highlighted on the street level image 1110. The server may use edge detection, similar color depth among neighboring pixels, other automatic image processing, or human assistance to identify the areas that the user may annotate on the surface of the geographic object 320. Alternatively, the system and method may permit the user to annotate any portion of the surface (such as by drawing a rectangle or polygon on the surface of the objects), or annotate any area that the object position data indicates is a relatively flat surface. Yet further, the system and method may prevent the user from selecting a polygon that is considered too large or too small. It may also prevent the user from selecting an area of the image that would occlude objects in the image.

Figure 14:
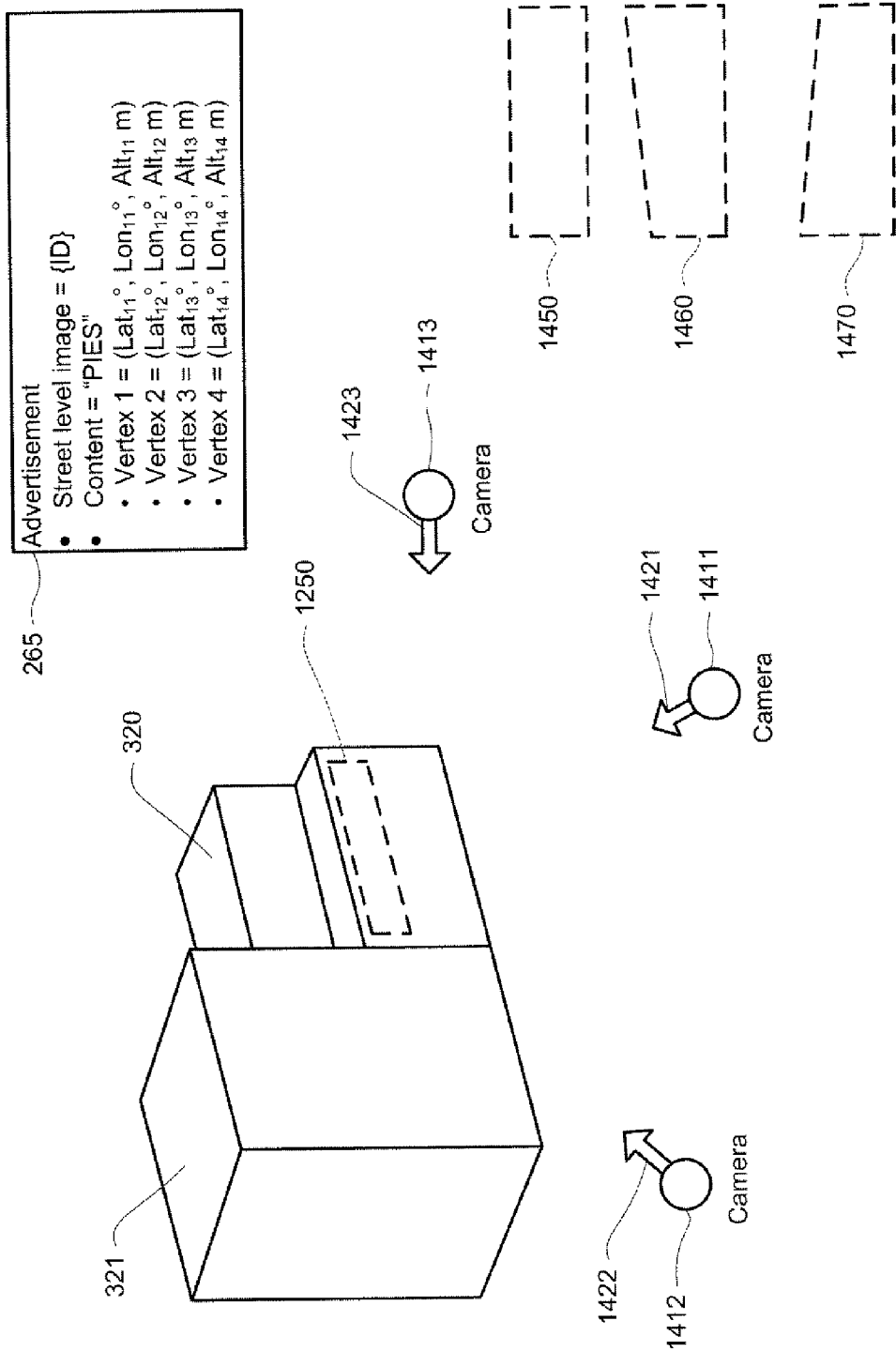
FIG. 14 is a diagram functionally illustrating, in accordance with an aspect of the invention: the geographic position of annotation information relative to geographic object objects as well as camera positions and angles, different shapes of the annotation information when it is displayed based on different camera positions and angles, and data representing the location of the annotation information relative to the camera positions.

The surface location of the advertisement may be stored with respect to the object position data of the objects in the street level image rather than (or in addition to) the position of the advertisement relative to the borders of the image. For example, FIG. 14 illustrates the location of the advertising space 1250 relative to surfaces of buildings 320 and 321 shown in FIG. 12. In addition to defining the content and an identification of the street level image in which the advertising is displayed, the advertisement data 265 may also identify the geographic location of the advertisement.

The location of the advertisement relative to the surface of the geographic object may be determined in various ways. For example, if the object position data of the geographic object is stored as described above in connection with FIG. 5, the latitude/longitude/altitude position of the vertices of the advertising space 1250 may be determined based on the pixel positions of the corners of the advertising space 1250.

Figure 13:
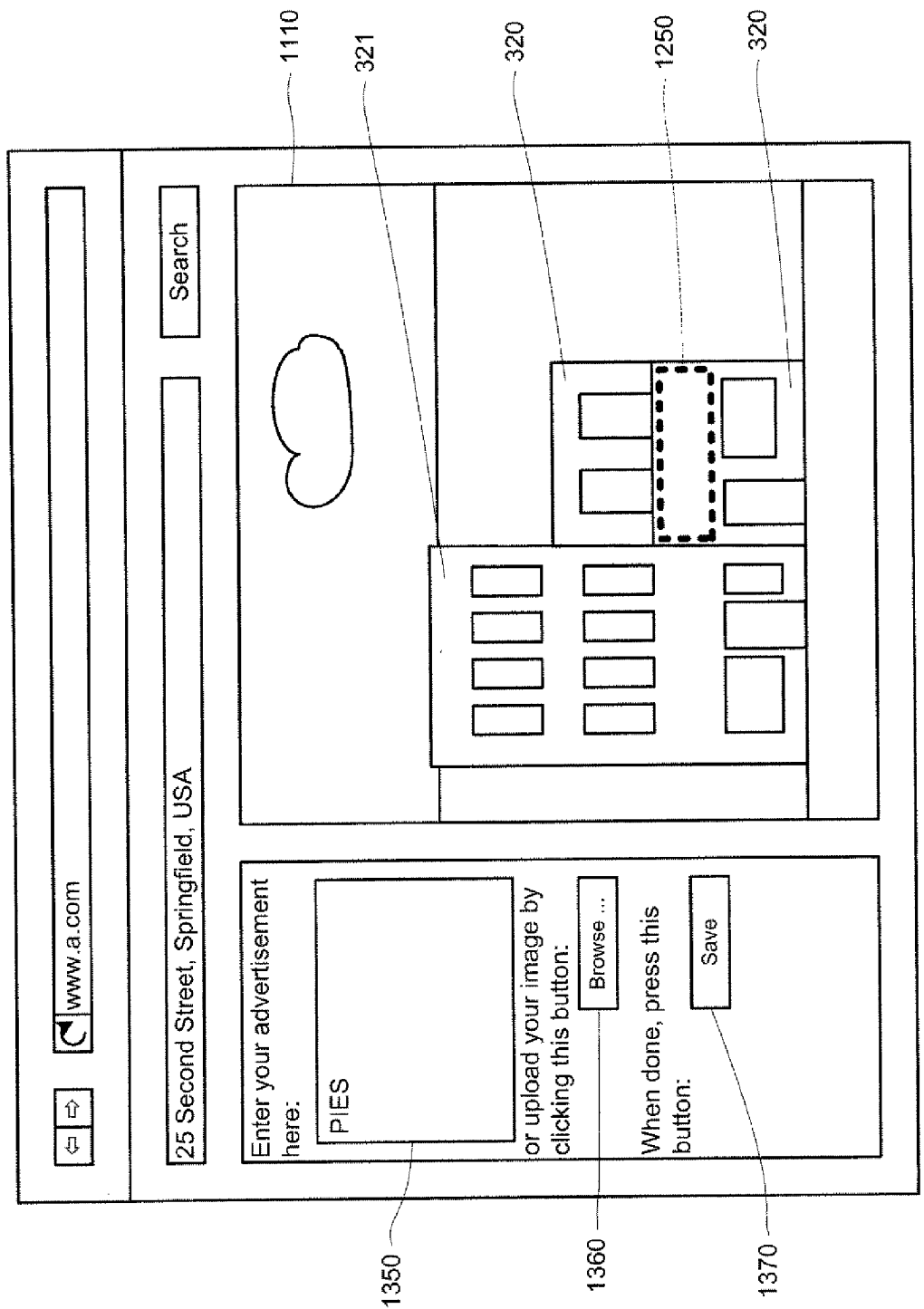
FIG. 13 is a screen shot in accordance with an aspect of the invention.

The user may also provide the content of their advertisement. For example and as shown in FIG. 13, the user may be provided with a textbox 1350 for entering text-based advertising. The user may also be provided with the option 1360 of using an image instead, such as by identifying and transmitting an image file from the client device 150 to the server 110. In that regard, the user may place advertising, such as a 300×100 pixel rectangle, over the door of his business that includes text (such as a menu) or an image (such a picture of a coupon that may be printed by other users).

The server may store the advertisement's content, the ad's location on the surface of the geographic object, and the identification of the street level image as an advertisement 265 associated with a listing 260. As explained above, the listing 260 in turn may be associated with a street location and street level image (FIG. 1).

When a user downloads the street level image showing the annotated geographic object, the street level image is transformed to illustrate the annotation as if the annotation were lying directly on the surface of the object.

By way of example only, a node of the network different from the node that uploaded the advertisement may navigate to a street level image that shows the advertisement. Specifically, a user of client device 170 may request a street level image 275 at a particular location.

When the system and method provides a street level image to be displayed by the requesting user, it may determine whether an advertisement is associated with the street level image. For example, when client device 170 (FIG. 1) requests a street level image 275 associated with a particular location, server 110 may determine whether there is an advertisement 265 having a surface location proximate to the latitude/longitude of the street level image. The server may determine this by querying the map database 270 for all advertisements 265 that identify the street level image to be displayed. The server may also determine this by determining whether the surface locations (such as a latitude/longitude positions) of any advertisements are proximate to the latitude/longitude of the location to be displayed.

If is determined that an annotation is to be displayed, the street level image is modified so as to display the annotation on the street level image. The modification may occur in a number of different ways, including the server generating a copy of the street level image, determining the pixels that will display the annotation instead of the geographic object, replacing the pixel's image information with the image information of the annotation, and transmitting the modified image to the client device. The client device may similarly perform the modification. Yet further, the client device may receive both annotation and the unaltered street level image, and display the annotation in a layer above the street level image so that it blocks a portion of the street level image when viewed by the user.

Figure 15:
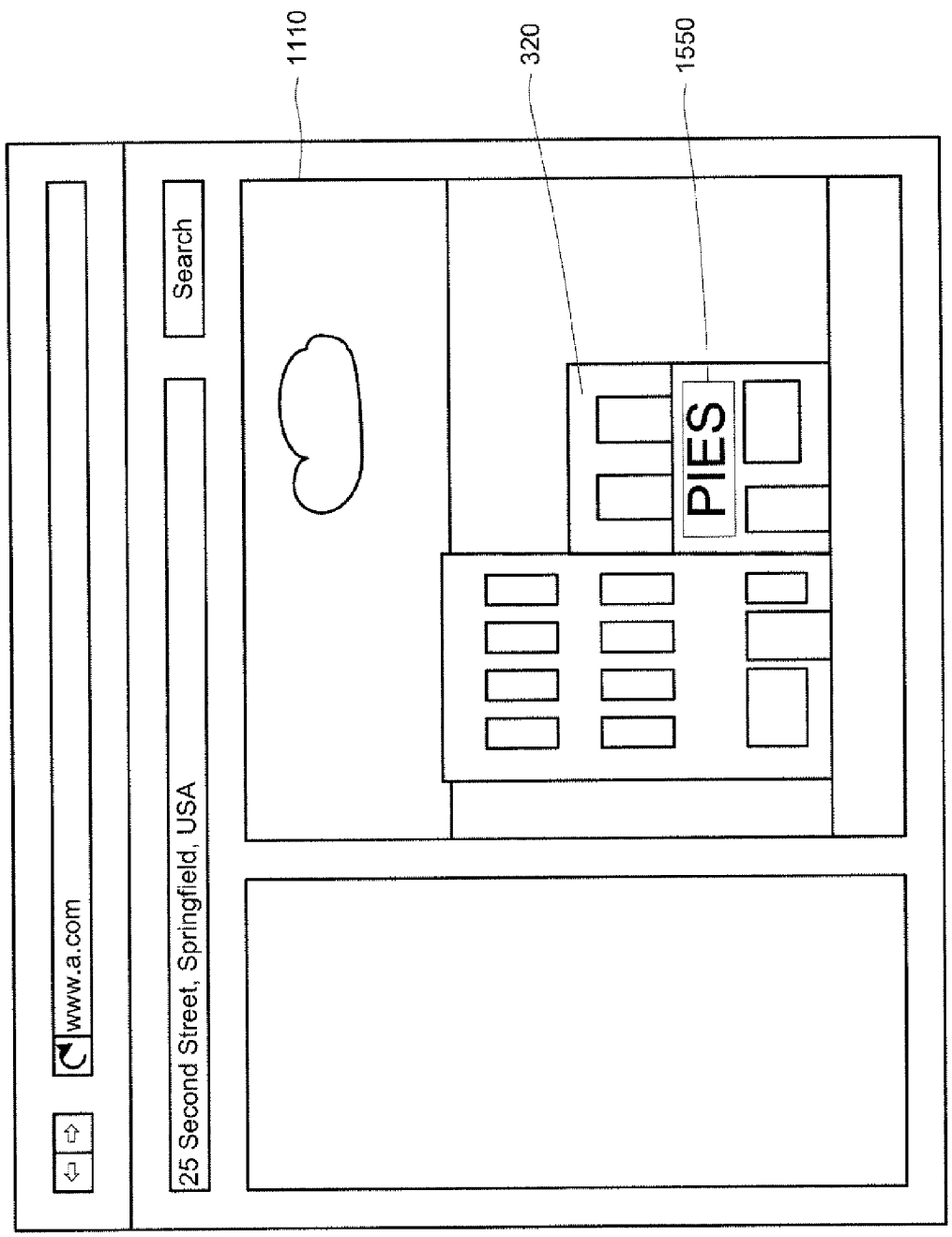
FIG. 15 is a screen shot in accordance with an aspect of the invention.

FIG. 15 is an example of a screen shot showing the advertisement. The advertisement 1550 is appended to the street level image 1110 as if it were on the surface of building, right above the door and front window. Street level image 1110 corresponds with camera position 1411 and angle 1421 of FIG. 14, namely, a camera position and angle that directly faces building 320. Accordingly, if the advertisement was rectangular shaped, it will appear rectangle shaped 1450 when viewed in the street level image.

Figure 16:
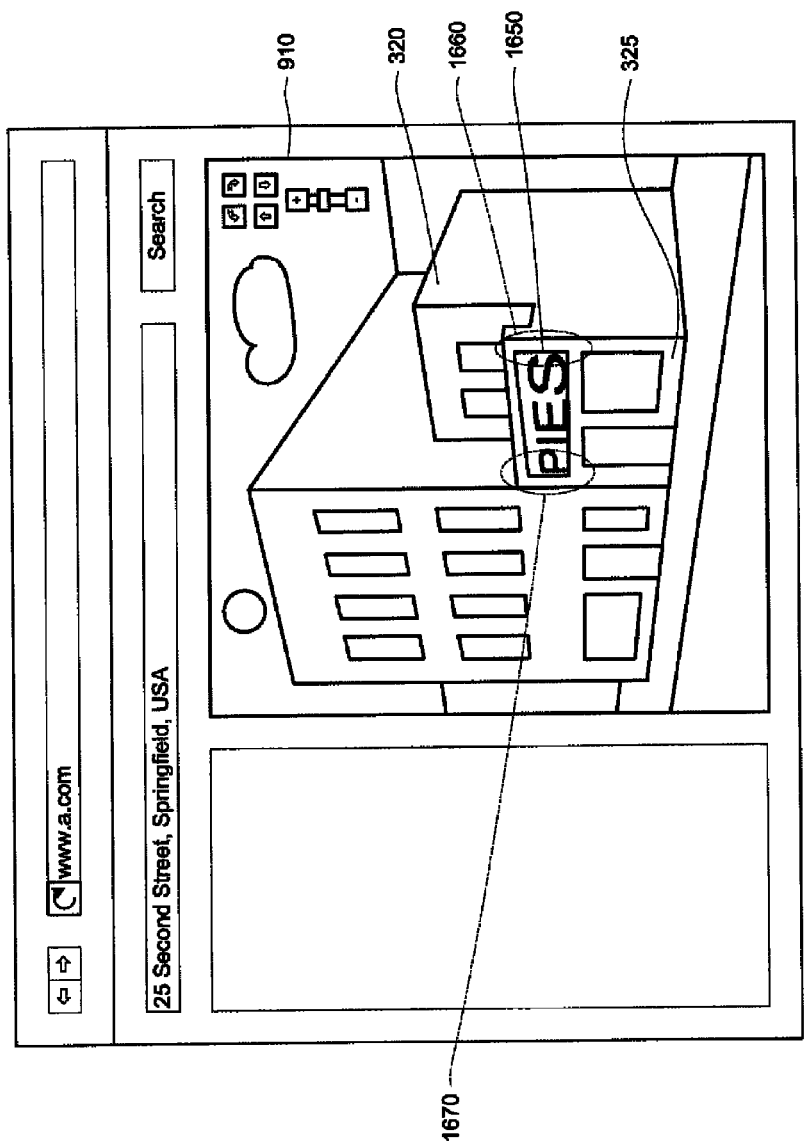
FIG. 16 is a screen shot in accordance with an aspect of the invention.

FIG. 16 is an example of the same advertisement from a different perspective, namely a camera location 1423 that is to the right of the buildings and at an acute angle 1423 relative to the plane of the front surface of the building (see FIG. 14). Like street level image 1110, street level image 910 is modified to show the advertisement 1650. However, because the front surface 325 of building 320 is at an angle to the camera angle, the shape of the advertisement 1650 needs to be skewed form its original rectangular shape. In that regard, to convey an appearance of distance that matches the surface of the building, the portion 1660 of the advertisement 1650 that is closest to the camera position needs to be taller than the portion 1670 that is farthest from the camera. This shape is also diagrammatically shown in FIG. 14 as shape 1460.

Figure 17:
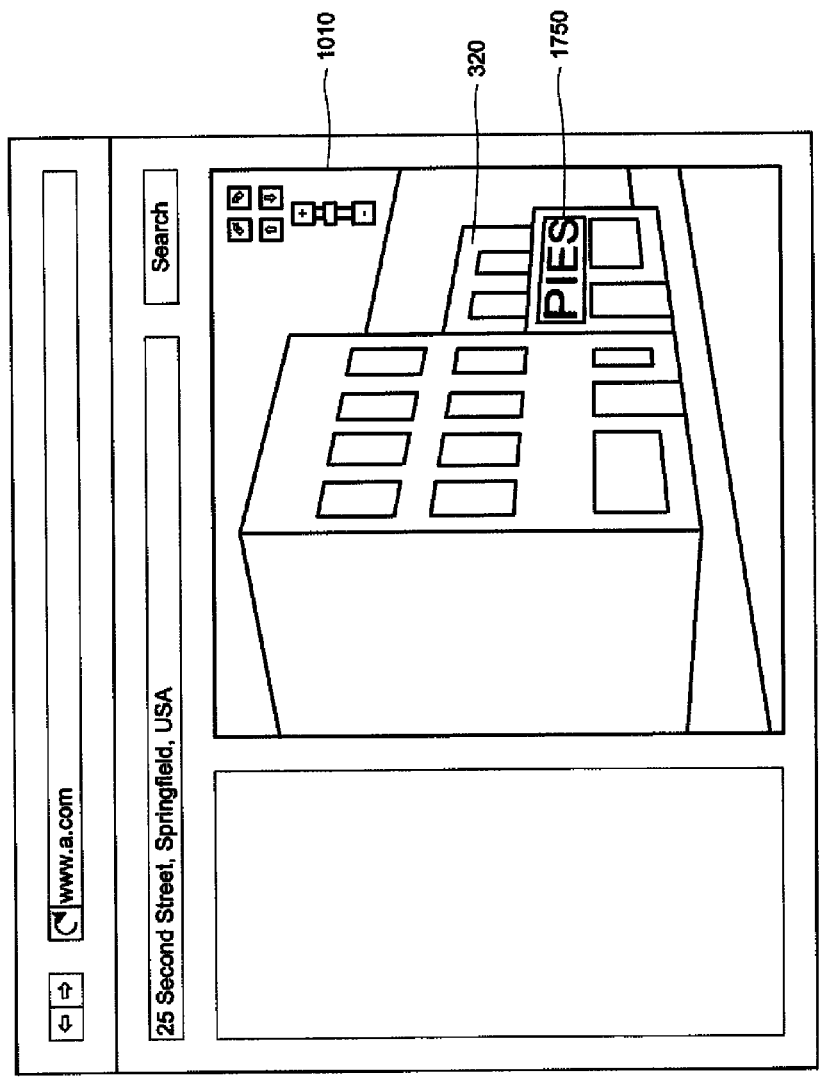
FIG. 17 is a screen shot in accordance with an aspect of the invention.

Shape 1470 illustrates a potential shape of the advertisement 1250 when the viewpoint is at position 1412 and at an angle 1422. The resulting annotated street level image, with the advertisement 1750 modified to match the surface of building 320, is shown in FIG. 17.

The shape of the annotation may be determined with a variety of image processing techniques. Because the 3D position of the advertisement (such as its latitude/longitude and altitude) and its content are known, the advertisement may be rendered in a 2D street level image based on any 3D camera position and angle using a image processing techniques known to those of ordinary skill in the art. For example, the advertisement may be structured as a polygon that is textured with respect to its content and where the coordinates of the vertices of the polygons correspond with the vertices' geographic locations. The 2D projection relative to the borders of the street level image may be computed using standard camera projections. Moreover, affirm transformation may be used for the texture mapping to approximate the perspective transformation in 3D space. Yet further, the textured polygon may be provided to a browser plug-in that supports 3D rendering along with instructions to display the polygons from a camera position and angle having coordinates that correspond with the camera position and angle that was used to capture—and display—the street level image.

The processor may accordingly overlay the advertisement directly on the objects of the street level image as if the content and images of the geographic objects were captured at the same time. When the user's viewpoint changes, the shape of the advertisement may be recalculated. This maintains the appearance of the advertisement lying on surface of the building even as the perspective changes.

Figure 18:
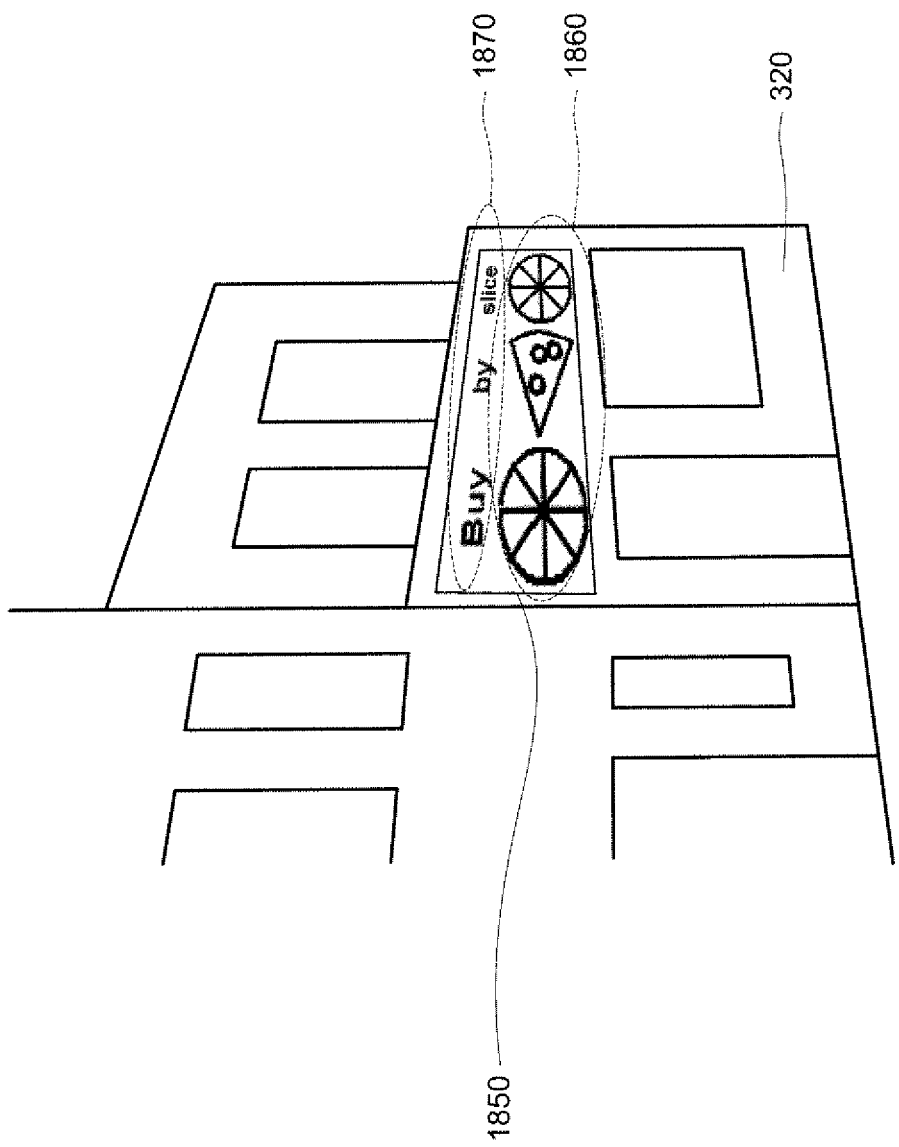
FIG. 18 illustrates annotation information comprising an image and displayed on the surface of an geographic object of an street level image.

As shown in FIG. 18, the advertisement 1850 may also be used to show non-text image 1860 in addition to text 1870 on building 320.

As noted above, multiple advertisements may be associated with a single listing. In that regard, the system and method may simultaneously display multiple advertisements in multiple locations such that all of the advertisements are skewed to conform with different surface locations of the same or different geographic objects. Different advertisements associated with different listings and sent by different users at different nodes of the network may also be simultaneously displayed in the same street level image.

In one aspect of the system and method, the user who placed the advertisement pays the operator of the server for showing the advertisement. For example, the server may both automatically transmit an invoice to the customer and handle the subsequent payment.

In another aspect, the image may also be transformed to illustrate the annotation as if it were floating in front of, above, or adjacent to the surface of the object. For example, the same content could be shown in different positions depending on how close or far the building is in the image shown to the user. For instance, if the annotated surface is up close, the advertisement may be shown directly on the façade of the building. However, if the same annotated surface is in the distance of the image, the advertisement may be shown as floating text above the building or a variety of other forms.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A computer-implemented method of displaying an image, the method comprising:

receiving, by one or more computing devices, indication of a geographic location, wherein the geographic location is capable of conversion into a latitude and longitude value;

receiving, by the one or more computing devices, a request for an image corresponding to the geographic location;

initiating access, by the one or more computing devices, to a database of captured images and corresponding object position data for surfaces of one or more geographic objects within the captured images, wherein each captured image represents a geographic object captured by a camera provided at a specific camera location and camera angle generally parallel to the ground, and wherein the object position data comprises latitude, longitude and altitude values for pixels in each captured image corresponding to surfaces of the geographic object facing the camera;

receiving from the database, by the one or more computing devices, a captured image in response to the request for an image, wherein the captured image is received based on a determined proximity of the specific camera location for the captured image relative to the latitude and longitude value corresponding to the geographic location;

providing a user interface for display in association with the captured image, the user interface comprising multiple blank spaces identified on one or more surfaces of the one or more geographic objects within the captured image for placement of annotation information, wherein the annotation information comprises information to be displayed with the captured image;

receiving user selection of one blank space from among the multiple blank spaces on the captured image;

generating, by the one or more computing devices, a second image based on the captured image, the annotation information, the object position data, and the selected blank space such that a portion of the captured image is replaced with a representation of the annotation information at a position on the surface of the geographic object corresponding to the selected blank space within the captured image defined with respect to the object position data, and the annotation information is displayed so as to conform with the geographic location of the surface based on the perspective from which the surface is being viewed;

initiating storage in the database, by the one or more computing devices, the second image including the annotation information and the location of the annotation information within the selected blank space on a surface of the geographic object as defined by object position data comprising latitude, longitude and altitude values for pixels in the second image corresponding to the surface of the geographic object on which the annotation information is to be displayed; and providing, by the one or more computing devices, to an electronic display, the second image.

2. The method of claim 1, wherein the annotation information comprises information associated with the geographic object.

3. The method of claim 2, wherein the annotation information comprises information associated with a business located within the geographic object.

4. The method of claim 1, further comprising receiving a request to associate the annotation information with the captured image.

5. The method of claim 1, further comprising receiving a request to associate the annotation information with the geographic object.

6. The method of claim 1, further comprising receiving a payment in response to providing the second image.

7. The method of claim 6, wherein the payment is received from the entity that provided the annotation information.

8. The method of claim 1, wherein the second image is provided by a server at a node of a network to an electronic display at another node of a network.

9. The method of claim 1, wherein the second image is generated at a computer and the method further comprises displaying the second image on an electronic display connected to the computer.

10. The computer-implemented method of claim 1, wherein the object position data comprises latitude, longitude and altitude values for pixels in the captured image corresponding to the surface of the geographic object on which the annotation information is to be displayed.

11. The computer-implemented method of claim 1, wherein the object position data comprises a distance from the surface of the geographic object to the camera for pixels in the captured image corresponding to the surface of the geographic object on which the annotation information is to be displayed.

12. The computer-implemented method of claim 1, wherein the object position data comprises a polygon defining the surface of the geographic object on which the annotation information is to be displayed, and wherein the polygon is defined by a plurality of vertices, each vertex being associated with a different geographic location and including a latitude, longitude and altitude value.

13. A computer-implemented method of displaying a geographic object, the method comprising:

transmitting, by one or more computing devices, over a network, data identifying a geographic location, wherein the geographic location is capable of conversion into a latitude and longitude value;

transmitting, by the one or more computing devices, over the network, a request for an image corresponding to the geographic location and for object position data defining surfaces of geographic objects within the image, wherein the object position data comprises latitude, longitude and altitude values for pixels corresponding to surfaces of geographic objects within the image;

receiving, by the one or more computing devices, from the network, data representing an image from a database and stored object position data defining surfaces of geographic objects within the image, wherein:

a portion of the image comprises an image of a geographic object that was taken proximate to the location at a specific camera location and camera angle generally parallel to the ground, wherein the image data is based on a determined proximity of the specific camera location for the image data relating to the latitude and longitude value corresponding to the geographic location and whereby the geographic object has a surface defined by the object position data, wherein the object position data is stored in association with the image data, a portion of the image comprises an advertisement, the advertisement portion of the image was determined by a processor such that the advertisement is displayed on the surface of the geographic object at a location defined by the object position data and such that the portions of the advertisement that correspond with the surfaces closer to the camera position are displayed larger than the portions of the advertisement that correspond with the surfaces that are farther from the camera position, and the advertisement is displayed at a position on the surface corresponding to a blank space, the blank space being pre-selected, via a user interface comprising multiple blank spaces on the geographic object for placement of the advertisement, by a user corresponding to the advertisement; and displaying, by the one or more computing devices, the image on an electronic display.

14. The method of claim 13, wherein the advertisement portion was provided by another node of the network.

15. The method of claim 13, wherein the advertisement portion corresponds with a business associated with the geographic object.

16. A computing system comprising:

a user input device;

a memory storing instructions;

a first processor in communication with the user input device so as to process information received from the user input device in accordance with the instructions; and a display in communication with, and displaying data received from, the processor;

the instructions comprising:

providing data identifying a geographic location, wherein the geographic location is capable of conversion into a latitude and longitude value;

providing a request for image data corresponding to the geographic location;

receiving image data representing a geographic object viewed from a specific camera location and camera angle generally parallel to the ground, the image data based on a determined proximity of the specific camera location for the image data relating to the latitude and longitude value corresponding to the geographic location and being from a database;

receiving stored object position data values for pixels in the image data, wherein the object position data values identify the latitude, longitude and altitude value at a plurality of pixels defining a surface of the geographic object facing the camera, wherein the object position data is stored in association with the image data;

receiving additional information that was not visible on the geographic object when the image data was captured; and displaying the image data and the additional information on an electronic display, wherein the additional information is displayed at a surface location on the geographic object defined in terms of the received object position data values such that the additional information appears to lie on a surface of the geographic object and the shape of the geographic object changes when the angle from which the geographic object is viewed changes;

wherein the additional information is displayed at a position on the surface corresponding to a blank space, the blank space being pre-selected, via a user interface comprising multiple blank spaces on the geographic object for placement of the additional information, by a user corresponding to the additional information.

17. The system of claim 16, further comprising a server, wherein the server receives the geographical location and provides the image data and additional information in response.

18. The system of claim 16, wherein the additional information is an advertisement.

19. A computing system of displaying images, comprising:
a first device at a first node of a network, the first device comprising a first memory storing a first set of instructions, a first processor that processes data in accordance with the first set of instructions, and an electronic display, a second device at a second node of a network, the second device comprising a second memory storing a second set of instructions and a second processor that processes data in accordance with the second set of instructions, said first set of instructions comprising receiving a geographic location identified by a user, wherein the geographic location is capable of conversion into a latitude and longitude value, transmitting the geographic location to the second device over the network, transmitting a request for a street level image corresponding to the geographic location, receiving the street level image corresponding to the geographic location from the second device, and displaying the street level image, wherein the street level image is captured from a camera provided at a specific camera location and camera angle generally parallel to the ground and wherein the street level image includes at least one building, wherein the received street level image is based on a determined proximity of the specific camera location for the captured image relative to the latitude and longitude value corresponding to the geographic location, said second set of instructions comprising receiving the geographic location from the first device, selecting the street level image corresponding to the geographic location from a database, determining stored object position data values identifying latitude, longitude and altitude values for pixels in the street level image corresponding to surfaces of the at least one building, wherein the object position data is stored in association with the captured image, selecting information to be displayed based on the geographic location, processing the street level image and the selected information to create an updated image containing both the street level image and the selected information such that the location of the selected information on a surface of the at least one building in the updated image is determined in part from the object position data values and such that the shape of the selected information on the updated image is based on the angle between a surface of the at least one building within the street level image and the direction of the camera when the street level image was captured, and transmitting the updated image to the first device for display on the electronic display;

wherein the selected information is displayed at a position on the surface corresponding to a blank space, the blank space being pre-selected, via a user interface comprising multiple blank spaces on the geographic object for placement of the selected information, by a user corresponding to the selected information.

20. The system of claim 19, wherein the network is the Internet.

21. The system of claim 19, wherein the first device is a wireless phone.

22. The system of claim 19, wherein the second set of instructions further comprises receiving data defining the position of different portions of the building surface relative to the position of the camera when the street level image was captured, and the position data is used to determine the shape of the selected information.

23. The system of claim 19, further comprising a third device at a third node of the network, and the second set of instructions further comprises receiving the selected information from the third device.

24. The system of claim 23, wherein the second set of instructions further comprises notifying the third device of the requirement for a payment in response to the selected information being displayed at the second device.

25. The system of claim 23 wherein the second set of instructions further comprises confirming that a user of the first device is associated with the building.

* * * * *